United States Patent [19]

Nakahara et al.

[11] 4,419,116
[45] Dec. 6, 1983

[54] PROCESS FOR PRODUCING OPTICAL FIBER PREFORM AND APPARATUS THEREFOR

[75] Inventors: Motohiro Nakahara, Mito; Naoki Yoshioka, Kanagawa; Hiroshi Yokota, Kanagawa; Tetsuo Miyajiri, Kanagawa; Minoru Watanabe, Kanagawa, all of Japan

[73] Assignee: Motohiro Nakahara et al., Tokyo, Japan

[21] Appl. No.: 329,958

[22] Filed: Dec. 11, 1981

[30] Foreign Application Priority Data

Dec. 12, 1980 [JP] Japan ................. 55-174726

[51] Int. Cl.³ ............................................. C03B 19/00
[52] U.S. Cl. ............................. 65/3.12; 65/18.2; 65/29; 65/158; 65/160
[58] Field of Search ............... 65/18.2, 3.12, 29, 144, 65/158, 160

[56] References Cited

U.S. PATENT DOCUMENTS 4,062,665 12/1977 Izawa et al .................. 65/3.12
4,135,901 1/1979 Fujiwara et al. ............. 65/3.12 X
4,224,046 9/1980 Izawa et al. .................. 65/3.12

OTHER PUBLICATIONS

I.E.E.E., vol. 68, No. 10, 1980, "Materials and Processes for Fiber Preform Fabrication - Vapor Phase Axial Deposition" by T. Izawa et al.

*Primary Examiner*—Richard V. Fisher
*Attorney, Agent, or Firm*—Sughrue, Mion, Zinn, Macpeak and Seas

[57] ABSTRACT

A process and apparatus for producing an optical fiber preform by oxidizing a gaseous glass forming material with a flame from a burner and depositing the resulting soot in a rod form are described, wherein two signal beams, supplied by splitting a light beam, are projected in a direction normal to the direction in which the preform grows and are directed into the space between the burner and the deposition face of the preform, and they are positioned so that one beam partially contacts the deposition face of the preform, while the other beam is directed to pass between the burner and the deposition face, and the distance between the burner and the deposition face is controlled such that the ratio of the intensity of the two beams passing through the space between the burner and the deposition face is held constant.

3 Claims, 1 Drawing Figure

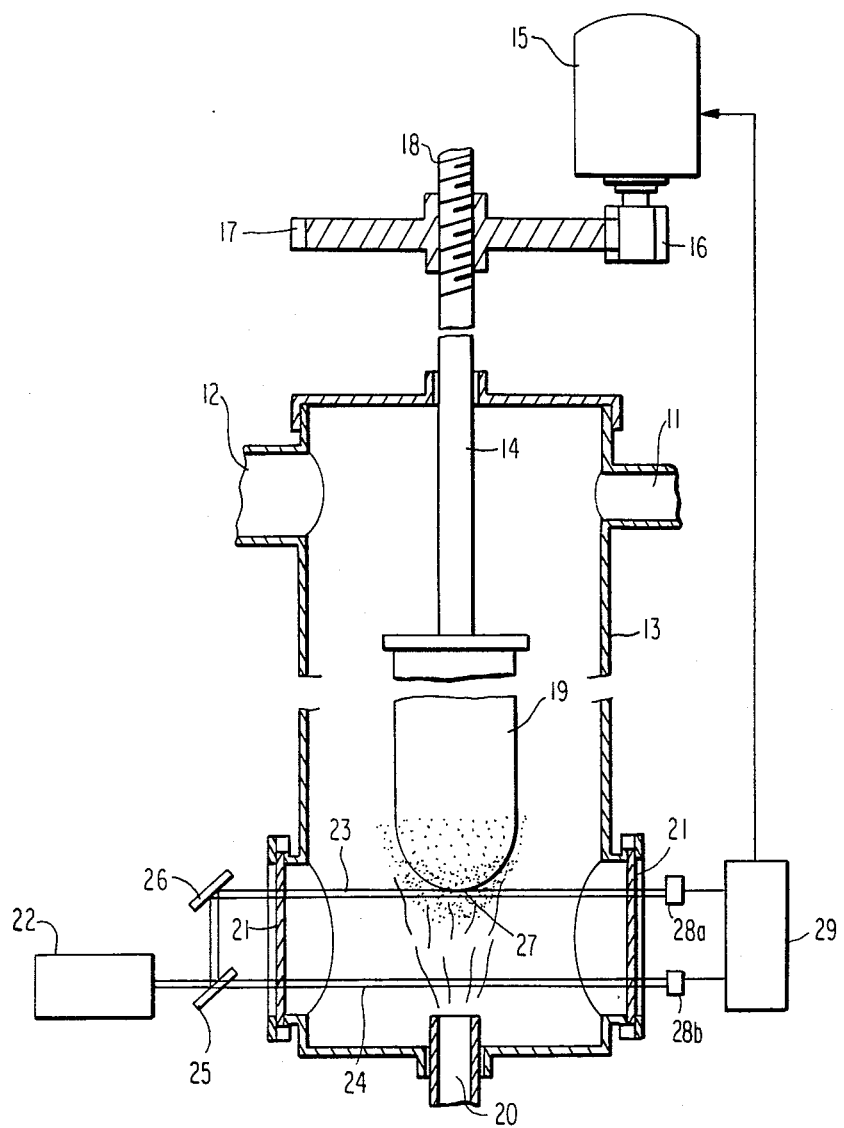

PROCESS FOR PRODUCING OPTICAL FIBER PREFORM AND APPARATUS THEREFOR

FIELD OF THE INVENTION

This invention relates to a process for producing an optical fiber preform by vapor-phase axial deposition, and, more particularly, it relates to a process which is capable of controlling the position of the deposition face of an optical fiber preform so that it is kept constant with respect to the position of burner.

BACKGROUND OF THE INVENTION

Fiber optics technology has advanced to such a level that it is now possible to fabricate a product having a transmission loss essentially reduced to the theoretical limit. The transmission bandwidth is an important factor for producing a long fiber that can be used for communications without repearters. Since the transmission bandwidth depends mainly on the distribution of the refractive index across the fiber cross-section, the cross-sectional refractive index distribution must be uniform in the longitudinal direction in order to produce a useful long fiber. Optical fibers are generally produced by a method comprising oxidizing gaseous glass-forming materials (such as $SiCl_4$, $GeCl_4$ and $POCl_3$) with the flame from a burner (usually an oxyhydrogen flame burner) and depositing the resulting soot in a rod shape which is then sintered in an electric furnace until it is vitrified, and spinning the resulting transparent glass preform to form a fiber, as disclosed in Izawa et al., U.S. Pat. No. 4,224,046, Fujiwara et al., U.S. Pat. No. 4,135,901, and Proceedings of the I.E.E.E., Vol. 68, No. 10, 1980, titled "Materials and Processes for Fiber Preform Fabrication - Vapor Phase Axial Deposition" by T. Izawa et al. The soot usually contains a dopant that modifies the refractive index of the glass. Therefore, if the distance between the burner and the deposition face of the preform formed by accumulating the soot in a rod form varies, the distribution of the dopant also changes, causing undesirable variations in the refractive index distribution of the resulting optical fiber. In conventional processes for producing the preform, the above disadvantages have been reduced by passing a monochromatic light beam between the burner and the deposition face of the preform in such a manner that the light contacts the deposition face and pulling up the supporting rod of the preform at a controlled rate while maintaining a constant intensity of transmitted light, or, alternatively, by monitoring the position of the deposition end of the preform with a television camera. However, such conventional processes have drawbacks, in that the flame oxidation is usually carried out in a vessel which is isolated from the outside atmosphere in order to prevent contamination by impurities, and, therefore, as the production period is extended, soot adheres to the inner surface of the observation window, which gradually becomes opaque, whereby the position of the deposition face of the preform becomes difficult to monitor.

SUMMARY OF THE INVENTION

An object of the present invention is therefore to provide an automatic and accurate method for keeping the distance between the burner and the deposition face of a preform constant so as to produce a long optical fiber having a uniform refractive index distribution in an axial direction.

The object of this invention can be achieved by a process for producing an optical fiber preform by oxidizing gaseous glass forming materials with a flame from a burner and depositing the resulting soot in a rod form, wherein two signal beams, supplied by splitting a light beam, projected in a direction normal to the direction in which the preform grows are directed into the space between the burner and the deposition face of the preform. In this process, the two beams are positioned in such a manner that one beam partially contacts the deposition face of the preform while the other beam is directed to pass between the burner and the deposition face, and the distance between the burner and the deposition face is controlled such that the ratio of the intensity of the two beams passing through the space between the burner and the deposition face is held constant.

BRIEF DESCRIPTION OF THE DRAWING

The accompanying drawing illustrates the operation of the process of this invention according to one embodiment wherein an optical fiber preform is produced by the vapor-phase axial deposition method.

PREFERRED EMBODIMENTS OF THE INVENTION

The process of this invention is hereinafter described by reference to the accompanying drawing, which illustrates the operation of one embodiment wherein a preform is produced by vapor-phase axial deposition (VAD). A protecting vessel (muffle furnace) 13 having an air supply port 11 and an exhaust port 12 also has a supporting rod 14 which is inserted into the muffle furnace 13 through an opening in the top of the muffle furnace and which is raised as it is rotated at a desired speed by a rotating mechanism (not shown). A motor 15 has a drive gear 16 that meshes with a gear 17 which further engages a feed screw 18 threaded within the rod 14 to provide for vertical movement. As a preform 19 builds up in a rod shape on the tip of the rod 14, the rod is lifted by being rotated with the rotating mechanism and the motor 15. Below the muffle furnace 13 is disposed an oxyhydrogen flame burner 20 that issues upwardly a gaseous glass forming meterial such as $SiCl_4$, $GeCl_4$ and $POCl_4$ and a dopant such as $GeCl_4$ for modifying the refractive index of glass as well as oxygen and hydrogen, to produce soot by flame oxidation at about 1000° C. The soot deposits on the tip of the rod 14 to form a rod-shaped preform 19.

Below the muffle furnace 13 are also arranged a pair of heat-resistant glass windows 21 that face each other across the muffle furnace 13. On the side of one of the windows 21 are arranged a laser oscillator 22, e.g., a He-Ne laser oscillator, a beam splitter that splits a laser beam from the oscillator into two signal beams 23 and 24, and a reflecting mirror 26. On the side of the other window 21 are arranged light-receiving elements 28a and 28b that receive the beams 23 and 24, respectively, that have passed through the flame between the burner 20 and the deposition face 27 of the preform, and a control means 29 that detects electrically the ratio of the intensity of the beams coming from the elements 28a and 28b, and controls the rotational speed of the drive gear 16 of the motor 15 so that the ratio remains constant. The two signal beams 23 and 24 are projected in a direction normal to the direction in which the supporting rod 14 ascends, and they are so positioned that one beam 23 contacts the deposition face 27 of the preform 19 while the other beam 24 passes just above the burner 20.

In the arrangement described above, once the distance between the burner 20 and the deposition face 27 of the preform has been set at a given level, the ratio of the intensity of the two signal beams 23 and 24 is determined and fed into the control means 29 which controls automatically the rotational speed of the gear 16 so that said raio remains constant, thereby keeping the distance between the burner 20 and the deposition face 27 of the preform constant throughout the fabrication of the preform. As a result, the preform 19 has a uniform refractive index distribution in a longitudinal direction and hence can be used with advantage in the production of a long optical fiber having small transmission loss. Furthermore, the glass soot that builds up on the inner surface of the glass windows 21 causes only an equal change in the brightness of the two signal beams, and this change has no adverse effect on the process of the present invention that uses the ratio of their intensity to control the rotational speed of the gear 16.

As discussed in the foregoing, the process of the present invention controls the ascending speed of the preform by the ratio of the intensity of two split beams of a light beam one of which is directed to pass in contact with the deposition face of the preform. Because of this arrangement, the process is not affected by practically any kind of turbulence, and is capable of maintaining the distance between the burner and the deposition face of the preform constant, thereby producing a good quality preform having a uniform refractive index distribution in the axial direction.

While the invention has been described in detail and with reference to specific embodiments thereof, it will be apparent to one skilled in the art that various changes and modifications can be made therein without departing from the spirit and the scope thereof.

What is claimed is:

1. A process for producing an optical fiber preform by oxidizing a gaseous glass forming material with a flame from a burner and depositing the resulting soot in a rod form, wherein two signal beams, supplied by splitting a light beam, are projected in a direction normal to the direction in which the preform grows and are directed into the space between the burner and the deposition face of the preform, the two beams being positioned so that one beam partially contacts the deposition face of the preform, while the other beam is directed to pass between the burner and the deposition face, the distance between the burner and the deposition face being controlled such that the ratio of the intensity of the two beams passing through the space between the burner and the deposition face is held constant.

2. A process as in claim 1, wherein the two signal beams are projected between the burner and the deposition face from a laser oscillator.

3. An apparatus for producing an optical fiber preform by oxidizing a gaseous glass forming material with a flame from a burner and depositing the resulting soot in a rod form, comprising a burner, a means for providing a light beam, a beam splitter, a means for reflecting a beam, two light receiving elements, and a control means for positioning a deposition face of the preform, arranged such that a light beam from the means for providing a light beam is split by the beam splitter and one of the beams from the beam splitter is reflected by the reflecting means such that the two beams pass between the burner and the deposition face of an optical fiber preform formed in said apparatus, such that one of the beams partially contacts the deposition face of the preform, and the intensity of said light beam is then determined by light receiving elements electrically connected to the control means such that the ratio of the intensity of the two beams passing through the space between the burner and the deposition face is held constant by movement of the deposition face.

* * * * *

UNITED STATES PATENT AND TRADEMARK OFFICE
CERTIFICATE OF CORRECTION

PATENT NO. : 4,419,116
DATED : December 6, 1983
INVENTOR(S) : Nakahara et al

It is certified that error appears in the above-identified patent and that said Letters Patent is hereby corrected as shown below:

On the title page:

Assignee: Delete "Motohiro Nakahara et al., Tokyo, Japan"

and insert --Nippon Telegraph & Telephone Public Corp. and

Sumitomo Electric Industries, Ltd.--.

Signed and Sealed this

Twenty-first Day of February 1984

[SEAL]

Attest:

GERALD J. MOSSINGHOFF

Attesting Officer

Commissioner of Patents and Trademarks